Patented July 9, 1946

2,403,474

UNITED STATES PATENT OFFICE 2,403,474

ADDITIVE FOR LUBRICANTS

John D. Bartleson and Franklin Veatch, Cleveland, Ohio, assignors to The Standard Oil Company, Cleveland, Ohio, a corporation of Ohio No Drawing. Application October 10, 1944, Serial No. 558,079

17 Claims. (Cl. 252—32.7)

This invention relates to lubricants and lubricant additives suitable for use under various conditions, including high temperatures or high pressures or both, as for example, use in an internal combustion engine operating at higher temperatures and in which the lubricant is in close contact with metallic surfaces, metal compounds and high temperature gases. Lubricating oils, particularly when used under such conditions, are subject to breakdown with lacquer deposition, sludge and acid formation, and tend to cause corrosion of the bearing and other metals with which they are in contact.

It is an object of the present invention to provide an agent which may be useful itself as a lubricant, and which when added to lubricants will markedly inhibit the very objectionable deposition of lacquer, and, at the same time, inhibit acid and sludge formation, corrosion and other types of deterioration occurring under operating conditions.

A further object is the provision of lubricating oils containing such an addition agent.

Another object of this invention is to provide heretofore unknown compositions made from raw materials not heretofore used in making products of this type, together with processes for their production.

Another object is to provide a novel composition which is superior in its functions to other compositions now available and intended for this same general purpose.

Other objects of this invention will be apparent as it is more fully disclosed hereinafter.

In considering the chemistry involved in the reactions pertinent to the invention, it is emphasized at the outset that it is usually accepted that one basic substance will not react with another basic substance to give a reaction product. It is also usually expected that when amines enter into reactions, the reaction products containing the amine nitrogen tend to be basic in nature. Therefore, it would be expected that the reaction product obtained from the reaction of an amine with a sulfide of phosphorus, for example, would not react at all with a basic metal compound, such as sodium hydroxide, or if it did react, that the amine reaction product would merely be decomposed by the stronger basic compound and the amine liberated.

Surprisingly enough, however, we have discovered that basic metal compounds do react with the reaction products obtained from the reactions of certain amines with a sulfide or sulfides of phosphorus to give heretofore unknown compositions containing the combined sulfide, amine and metal radicals or residues. In addition, we have discovered that this reaction results in good yields and is free from the high losses inherent in processes forming sludges.

We have also discovered that such compositions are suitable as addition agents for lubricants and that when so employed they impart markedly advantageous properties thereto.

The final reaction product is readily made in two steps, the first of which is the reaction between the sulfide and the amine, and the second of which involves the basic metal compound.

The sulfide-amine reaction may be carried out with direct admixture of the reactants, or by their admixture in the presence of a diluent which may or may not be subsequently removed. A volatile inert solvent, such as one boiling in the heptane-octane range, may be used as a diluent which is to be subsequently removed. Alternatively, a heavier oil such as white oil, or a lubricating oil of about the same properties as that to which the new composition is to be added, may be used as a diluent which is not to be removed. If a volatile solvent is used it may be selected so as to have a boiling point that will assist in controlling the temperature if the reaction is carried out under reflux conditions. In a commercial embodiment of the invention a diluent probably would not be used unless it is a mineral oil, but this is not necessary.

The sulfide-amine reaction may be carried out at a temperature over a wide range. A temperature in the range of about 100° to 400° F., and preferably in the range of 250° to 400° F. is preferred. The reaction is mildly exothermic and on a commercial scale this heat developed may be used to maintain the temperature. The ingredients may be added in increments if this is desirable for temperature control or other reasons.

The reaction is usually complete in four hours or less time. The reaction time is a function of the temperature, the amount of the sulfide that is to react, the subdivision of the sulfide, rate of stirring, etc. The sulfide is insoluble in the amine, reaction product, and diluent and the end point of the reaction is easily determined when the desired amount of the sulfide is no longer present as a solid in the reaction mixture.

The amine or amines may be reacted with the sulfide or sulfides in mol ratios of one mol of amine to from 0.01 to 2.0 or more mols of sulfide. Even small amounts show a significant improvement. Economic factors may make it undesirable to use more than about 2.0 mols of the sulfide. Generally about 0.25 to 1.0 mol is the usual range that will be used.

The pentasulfide is preferred though the sesquisulfide or any other sulfide or mixtures of sulfides may be employed. Phosphorus pentasulfide is economic and readily available and for this reason was used in the illustrative examples. Under suitable conditions sulfides of arsenic or antimony may be similarly employed.

A very large variety of amines have been found to react, for example, either aliphatic, aromatic or heterocyclic primary or secondary amines or derivative primary or secondary amines thereof. The choice may be limited by the desired lubricant solubility characteristics of the final metal derivative product. For this reason primary and secondary aliphatic amines which have an aliphatic radical of at least 12 carbon atoms are preferred, and of these the (mono) or (di) octadecyl or hexadecyl amines or mixtures containing at least one of them are given as illustrative. Commercial dioctadecyl amine is the most readily available of the amines and for this reason is used in many of the illustrative examples.

The amine stock may be a mixture of different amines of different molecular weight and degrees of substitution. Tertiary amines, although not as desirable may be present. Generally, the more saturated amines are preferred.

The yield is very high and appreciable amounts of oil insoluble or gaseous products are not formed. An excess of any unreacted sulfide may be filtered off, but generally the amount is chosen so that it will all react at the temperature selected, and the reaction is continued until it is consumed.

The sulfide-amine reaction products may be converted to their metal derivations by reaction with one or more metal compounds, such as their oxides or hydroxides. These metals may be one or more of the following: an alkali metal, such as sodium, potassium and lithium; an alkaline earth metal, such as calcium, barium, strontium; or aluminum or other metal lower than aluminum in the electromotive series, such as zinc, lead, chromium, cobalt, antimony, arsenic, tin, copper, or molybdenum. The metal should be selected with reference to the use of the composition and the properties desired in it. The alkali and alkaline earth metals have excellent detergent characteristics. The heavier metals have surface corrosion inhibition characteristics. The preferred metals are group II and group III metals of the periodic table such as zinc, barium and aluminum.

This second reaction may be carried out at temperatures in about the same range as described heretofore, a temperature of about 180° to 250° F. being preferred. This reaction is also usually completed in four hours or less time and the same factors as to reaction time are involved as discussed heretofore. A diluent may be used, as described heretofore, but is not necessary. If a diluent was used in the sulfide-amine reaction it may be carried over into this reaction step and may be subsequently separated if desired. From about 0.25 to about 6.0 equivalents of the metal compound may be used per mol of the sulfide in the sulfide-amine reaction product, preferably about 4.0 to about 6.0 equivalents in the case of zinc or aluminum and also about 4.0 to 6.0 in the case of barium. An equivalent is the quotient of a mol divided by the valence of the metal concerned. The metal hydroxide is generally insoluble in the sulfide-amine reaction product and the amount that reacts is the amount that is no longer present as a solid phase in the reaction product.

It is beneficial to have water present in the reaction and this may be introduced as water of crystallization, or as a hydrate of the metal compound or it may be introduced separately.

A plurality of metals can be used such as sodium and calcium, calcium and barium, calcium or zinc and aluminum or tin. If the amount of the metal is small, the final product may be a mixture of the initial reaction product and the metal derivative. It is preferable, however, to introduce a relatively large amount of the basic compound into the initial reaction product as the desirable properties are attributed to the metal derivative.

The yield in this second reaction is also very high. In the case of the barium compound the yield is from 90 to 95% and in the potassium compound the yield is almost 100%.

After the reactants have all entered into solution, the reaction is complete. The reaction mass is then centrifuged or filtered to remove water and any traces of oil-insoluble by-product substances. If an excess of the basic metal compound is used, the unreacted excess may be separated at this stage. If a volatile solvent was used as a diluent, it may be removed by vacuum distillation. The final products are usually waxy solids at room temperatures, and clear, colored oils at temperatures above their melting points.

These new compositions impart many desirable properties to lubricants to which they have been added. They act as very powerful detergents therein, and as antioxidants and corrosion inhibitors. They also improve the viscosity index and have a very striking effect as pour point depressants. The metal derivatives are far superior to the corresponding sulfide-amine reaction products as additives for lubricants.

The amount of the above described metal derivative of the sulfide-amine reaction product to be added to an oil or grease will depend upon the characteristics of the oil or grease and the intended use. Some oils have more of a tendency to corrode metals, or to form acids, sludges and lacquer deposits than others, and such oils require larger quantities of the addition agent. Also oils that are intended for higher temperatures require larger amounts of the additive. In general, the range is from 1 to 10%, but under some circumstances amounts as low as .01% show a significant improvement. As to an upper limit, of course, it may be uneconomical to add more than is necessary to impart to the lubricant the desired properties. Generally, not over about 50% would usually be used.

The following examples of the preparation of new compositions in accordance with the invention and tables of results of tests of lubricants comprising some of such compositions will serve to illustrate and point out some advantages but in no wise to limit the scope of the invention as otherwise disclosed and claimed herein.

*Example 1*

(a) 200 grams of commercial dioctadecylamine (a mixture of about three parts of dioctadecylamine and one part of trioctadecylamine), 32 grams of phosphorus pentasulfide and 500 cubic centimeters of a heptane fraction of boiling range 90° to 100° C. were mixed and refluxed for 48 hours. A homogeneous solution resulted.

The heptane fraction was removed therefrom by distillation under reduced pressure and a waxy residue was obtained. This analysed as 8.94% sulfur and 6.55% phosphorus.

(b) 80 grams of this waxy residue was heated with 20 grams of barium hydroxide octahydrate $(Ba(OH)_2.8H_2O)$ for 4 hours at 190° F. and for 1 hour at 250° F.; then the mixture was filtered hot. The filtrate was a waxy brown solid at room temperature. It analysed 1.60% phosphorus, 3.79% sulfur and 3.69% barium.

*Example 2*

(a) 450 grams of commercial dioctadecylamine, 71.9 grams of phosphorus pentasulfide and 2250 cubic centimeters of a heptane fraction of boiling range 90° to 100° C. were mixed and refluxed for 4 hours. A homogeneous solution resulted. The reaction yield was better than 95%.

(b) 102 grams of barium hydroxide octahydrate $(Ba(OH)_2.8H_2O)$ was added to the solution and the whole refluxed for 4 hours more. During this period some gas was evolved from and a small amount of white inorganic precipitate was formed in the mixture. The solution was filtered hot to remove water and insoluble by-products. The heptane fraction was removed by distillation under reduced pressure, mostly at water bath temperatures and finally at 125° C. The residue was a clear red oil at 50° C. and a waxy solid at room temperature. It analysed 18.4% ash, 12.45% barium, 2.83% sulfur and 3.62% phosphorus. The reaction yield in this step was 90 to 95%.

*Example 3*

(a) 1050 grams of commercial dioctadecylamine, 267 grams of phosphorus pentasulfide and 3150 grams of #225 Red oil (an acid treated Mid-Continent lubricating oil base stock) were mixed and heated with agitation to 200° F. for 4 hours. All the phosphorus pentasulfide had then reacted. 4467 grams of a clear oily product were obtained.

(b) 160 grams of this oily product and 13.6 grams of barium hydroxide octahydrate were mixed and heated with agitation to 200° F. for 4 hours. The reaction mixture was centrifuged hot to remove water and oil insoluble by-products. 154 grams of a waxy oil was obtained. This corresponds to a 25% solution of the barium derivative of the amine-phosphorus pentasulfide reaction product of the oil. It analysed 5.80% ash, 5.25% barium, 1.49% sulfur and 1.61% phosphorus.

*Example 4*

(a) 120 grams of oily product as obtained in Example 3a, 5.4 grams of potassium hydroxide, and 1.7 grams of water were processed according to the procedure of Example 3b. 104 grams of product were obtained. It analysed 3.43% ash, 1.76% phosphorus and 1.48% sulfur.

*Example 5*

Following the procedure of Example 4 the corresponding derivatives of the following metals were prepared:

(a) The stannous tin derivative was made from 120 grams of oily product as obtained in Example 3a and a moist white precipitate of stannous hydroxide prepared from 7.2 grams of $SnCl_2.2H_2O$ by treatment in aqueous solution with excess sodium carbonate and separation of the precipitate by centrifuging and then decanting the liquid. 105 grams of product were obtained. It analysed 3.40% ash.

(b) The aluminum derivative was made from 120 grams of oily product as obtained in Example 3a and an aluminum gel freshly prepared by treatment of 8.0 grams of $Al(NO_3)_3 9H_2O$ in aqueous solution with excess ammonia and separation of the gel. 108 grams of product were obtained. It analysed 1.27% ash.

(c) The strontium derivative was made from 120 grams of oily product as obtained in Example 3a and 8.5 grams of strontium hydroxide $Sr(OH)_2.8H_2O$. 115 grams of product were obtained. It analysed 5.38% ash.

(d) The lithium derivative was made from 120 grams of oily product as obtained in Example 3a, 2.3 grams of LiOH and 2.0 grams of water. 110 grams of product were obtained.

(e) The calcium derivative was made from 120 grams of oily product as obtained in Example 3a, 4.8 grams of $Ca(OH)_2$ and 1.2 grams of water. 115 grams of product were obtained. It analysed 0.90% ash.

(f) The sodium derivative was made from 120 grams of oily product as obtained in Example 3a, 5.2 grams of NaOH and 2.4 grams of water. 115 grams of product were obtained. It analysed 6.15% ash.

*Example 6*

Following the procedure of Example 4, the following derivatives containing different percentages of the metallic element (as shown by the different ash analyses) were prepared from 500 grams of product of Example 3a:

(a) 15.2 grams of potassium hydroxide and 10.0 grams of water gave 490 grams of product (95.3% yield) which analysed 2.71% ash.

(b) 19.0 grams of potassium hydroxide and 12.5 grams of water gave 494 grams of product (95.3% yield) which analysed 3.60% ash.

(c) 22.8 grams of potassium hydroxide and 15.0 grams of water gave 501 grams of product (96.1% yield) which analysed 3.90% ash.

*Example 7*

(a) 59 grams of commercial dioctadecylamine, 19 grams of phosphorus pentasulfide and 177 grams of white oil were mixed and heated with agitation for 4 hours at 300° F. The mixture was filtered hot. 222 grams of viscous brown oil were obtained.

(b) 80 grams of this brown oil and 20 grams of barium hydroxide octahydrate were mixed and heated with agitation for 4 hours at 200° F. and then for 1 hour at 250° F. The mixture was filtered hot. 90 grams of product were obtained. The overall reaction yield was better than 95%. This product was a fluid oil at 200° F. and a waxy solid at room temperature. It analysed 1.48% sulfur and 0.27% phosphorus.

*Example 8*

(a) 78 grams of commercial mono-octadecylamine-mono-hexadecylamine mixture, 33 grams of phosphorus pentasulfide, and 500 cubic centimeters of a heptane fraction of boiling range 90° to 100° C. were mixed and refluxed for 4 hours.

(b) Then 25.3 grams of potassium hydroxide and 8.0 grams of water were added and the new mixture refluxed for 4 hours. The mixture was then filtered hot and the filtrate heated with agitation to 250° F. to remove the heptane fraction diluent and leave the product as a residue. 110 grams of a brown waxy solid product were obtained.

Example 9

(a) 525 grams of commercial dioctadecylamine, 133.5 grams of phosphorus pentasulfide and 1575 grams of #225 Red oil were mixed and heated to 300° F. with agitation for 4 hours.

(b) 500 grams of the product resulting from 9a was mixed with 33 grams of zinc oxide and heated to 200° F. with agitation for 1 hour; then 18 grams of water were added and the treatment continued for 2 hours more. The mass was heated to 250° F. and blown with air for 2 hours, then it was centrifuged and filtered. 467 grams of product were obtained. It was an amber waxy solid at room temperature and analysed 3.82% ash.

In order to demonstrate the properties of the metal derivatives of the phosphorus sulfide-amine reaction products in improving the characteristics of lubricating oils and to compare such derivatives in accordance with the invention with phosphorus sulfide-amine reaction products and with each other, a large number of representative additives were incorporated into conventional lubricating oils. The lubricating oils containing these additives were tested according to laboratory test procedures for evaluating the service stability of oils as described in a paper by R. E. Burk, E. C. Hughes, W. E. Scovill and J. D. Bartleson presented at the Atlantic City meeting of the American Chemical Society in September, 1941, and in another paper by the same authors presented at the New York city meeting of the American Chemical Society in September, 1944. The latter paper also correlates the results of such laboratory tests with the so-called "Chevrolet engine test."

Essentially the laboratory test equipment consists of a vertical, thermostatically heated, large glass test tube, into which is placed a piece of steel tubing of about one third its length and of much smaller diameter. A piece of copper-lead bearing strip is suspended within and from the upper end of the steel tube by a copper pin, and an air inlet is provided for admitting air into the lower end of the steel tube in such a way that in rising the air will cause the oil present to circulate. The test tube is filled with an amount of the oil to be tested which is at least sufficient to submerge the metals.

The ratios of surface active metals to the volume of oil in an internal combustion test engine are nearly quantitatively duplicated in the test equipment. In the "Standard" test the temperature used is approximately the average temperature of the crankcase, and the "Temperature tolerance" test temperature is approximately that of the piston ring zone of a test engine in operation. The rate of air flow per volume of oil is adjusted to the same as the average for a test engine in operation. Catalytic effects due to iron are empirically duplicated by the addition of a soluble iron salt and those due to lead-bromide by its addition. The duration of the test is adjusted to that usually used in engine type tests. As is shown by the data in the papers referred to, the laboratory tests have been correlated with engine tests and the properties of the oil in an engine may be determined from the result of the laboratory tests.

The results given in the following tables were obtained from tests using:

A 160 cubic centimeter sample of the lubricant composition
70 liters of air per hour
100 square centimeters of steel surface
4.4 square centimeters of copper-lead surface
1.0 square centimeter of copper surface
0.10% by weight of lead bromide powder
0.012% soluble iron calculated as $Fe_2O_3$ (ferric 2-ethyl hexoate in C. P. benzene)

The "Standard" tests were run at 280° F. for 36 hours; the "Temperature tolerance" (heavy duty) tests were run at 350° F. for 10 hours. The lacquer is deposited on the steel tube and is determined by difference in weight of the tube after washing with chloroform and drying to constant weight. The oil insoluble sludge remaining in the glass tube is thought to be related to similar sludge deposits in engines, and was rated visually against color photographic standards, an appearance rating scale ranging from F (worst) through A (best) being used. The corrosion was determined by difference in weight of the copper and heavy metal pieces after scrubbing with chloroform. The used oil was sufficient to enable the determination of all of the usual oil tests, viz. isopentane insolubles, viscosity, acid number, etc.

The data in the following three tables shows the results obtained in testing our new additives by two tests described.

"Standard" tests on a conventional Mid-Continent acid treated lubricating oil base stock blended with Pennsylvania bright stock (S. A. E. 20), and compositions containing this oil and a metal derivative of a phosphorus pentasulfide amine reaction product, were run on a number of the additives; the results given in Table I are representative:

Table I

| Additive from Example No. | Concentration of additive in per cent by weight | Lacquer deposit (in milligrams) | Sludge (isopentane insoluble in milligrams) | Corrosion (in milligrams) weight loss of— | | Acid number | Viscosity increase | Appearance rating |
|---|---|---|---|---|---|---|---|---|
| | | | | Copper | Copper-lead | | | |
| None | 0 | 11.4 | 193.3 | 1.3 | 7.4 | 2.8 | 642 | D+ |
| 3b | 3 | 1.8 | 0.6 | 1.2 | 0.2 | 0.9 | 11 | A− |
| 4b | 3 | 1.0 | 5.6 | 0.8 | 3.0 | 0.4 | 8 | A− |
| 5b | 3 | 1.3 | 2.5 | 0.4 | 0.0 | 1.7 | 27 | A− |
| 5c | 3 | 5.8 | 1.1 | 0.6 | 1.1 | 1.9 | 27 | A− |
| 5d | 3 | 1.1 | 0.0 | 0.9 | 3.4 | 2.7 | 18 | A− |
| 7b | 3.0 | 0.9 | 13.0 | 0.0 | 0.4 | 0.4 | 10 | B+ |
| 8b | 1.5 | 2.8 | 5.3 | 1.2 | 2.5 | 1.1 | 21 | A− |
| 9b | 1.5 | 0.5 | 10.3 | 0.9 | 1.8 | 1.2 | 6 | A+ |

The data in Table I show the marked improvement imparted to the oil composition in the important lacquer deposit characteristic, as well as in much decreased sludge formation, and strikingly lower viscosity increase. The detergent properties of compositions containing the metal derivatives of sulfide-amine reaction properties are clearly pointed out in this table by the lower lacquer deposit and better appearance ratings.

"Temperature tolerance" (heavy duty) tests on compositions containing conventional Mid-Continent acid treated lubricating oil base stock blended with Pennsylvania bright stock (S. A. E. 20), and a phosphorus pentasulfide amine reaction product, and a metallic element derivative of such a reaction product, were run on the barium derivative as illustrative; the results are given in Table II.

silicate was found to prevent foaming upon bubbling of air through oil containing a few per cent of the additive.

It will be obvious to one skilled in the art that sulfide-amine reaction products and similar products obtained by introducing phosphorus and/or sulfur into an amine as prepared according to different procedures but having substantially the same properties as those herein described, may be converted to metal derivatives in accordance with the invention. The invention as claimed contemplates such compositions as set forth in the following claims.

*Table II*

| Additive from Example No. | Concentration of additive in per cent by weight | Lacquer deposit (in milligrams) | Sludge (isopentane insoluble in milligrams) | Corrosion (in milligrams) weight loss of— | | Acid number | Viscosity increase | Appearance rating |
|---|---|---|---|---|---|---|---|---|
| | | | | Copper | Copper-lead | | | |
| None | 0.0 | 4.8 | 235.0 | 0.4 | 25.2 | 2.2 | 1,479 | B+ |
| 2a | 3.0 | 18.9 | 212.2 | 1.9 | 0.1 | 1.3 | 137 | B |
| 2b | 3.0 | 2.1 | 13.9 | 0.6 | 1.1 | 1.0 | 71 | B+ |
| 2b | 1.5 | 1.9 | 87.2 | 0.1 | 0.5 | 0.8 | 69 | A |
| 9b | 1.5 | 1.0 | 18.5 | 0.6 | −0.2 | 1.2 | 60 | A− |

The data in Table II show the decidedly better effects of the metal derivative as compared to the sulfide-amine reaction product when used as an additive for a lubricating oil. This heavy duty test particularly accentuates detergent properties; the compositions with better detergent properties showing lower lacquer deposits and better appearance ratings. It is clear from this table, that the sulfide-amine reaction products are far inferior as additives to the corresponding metal derivatives as to this characteristic, as well as to sludge formation and effect on viscosity. The data in this table also show a smaller amount of the additive may be used to advantage.

"Standard" tests and physical tests on heavy duty lubricants containing a conventional Mid-Continent acid treated lubricating oil base stock blended with Mid-Continent bright stock (S. A. E.—20 H. D. base), and a metal derivative of a phosphorus pentasulfide amine reaction product were run on the potassium and barium derivatives and the results are given in Table III.

We claim:
1. An additive for lubricants to improve their characteristics, comprising a metal derivative of a reaction product of a sulfide of phosphorus and an organic amine.

2. An additive for lubricating oils and greases to improve their characteristics, comprising a metal derivative of a reaction product of a sulfide of phosphorus and an organic amine having at least one hydrogen attached directly to the nitrogen.

3. An additive for lubricating oils and greases to improve their characteristics, comprising a group II metal derivative of a reaction product of phosphorus pentasulfide and an amine having at least one hydrogen attached directly to the nitrogen and having at least one radical of at least twelve carbon atoms.

4. An additive for lubricating oils and greases to improve their characteristics, comprising a group III metal derivative of a reaction product of phosphorus pentasulfide and an organic amine

*Table III*

| Additive from Example No. | Concentration of additive in per cent by weight | Lacquer deposit in milligrams | Sludge (isopentane insoluble in milligrams) | Corrosion (in milligrams) weight loss of— | | Acid number | Viscosity increase | Appearance rating | Viscosity index | Pour point | Solid point |
|---|---|---|---|---|---|---|---|---|---|---|---|
| | | | | Copper | Copper-lead | | | | | °F. | °F. |
| Blank | 0.0 | 30.4 | 614.8 | 4.6 | 3.0 | 7.0 | 985 | D− | 74.2 | 30 | 25 |
| 2 | 3.0 | 0.9 | 1.0 | 1.0 | 1.4 | 1.2 | 52 | A− | 79.7 | −10 | −15 |
| 4 | 4.0 | 0.8 | 0.0 | 3.3 | 3.5 | 1.7 | 32 | A | 76.7 | −20 | −25 |

In addition to showing the qualities pointed out in the discussion of the data in Tables I and II the data in Table III show the marked improvement in pour point and solid point of this heavy duty oil imparted thereto by compositions of the invention, as well as improvement in viscosity index.

In order to prevent foaming of the oil containing a small proportion of the additive it is desirable in some cases to add a very small amount of tetra-amyl silicate, or an alkyl ortho carbonate, ortho formate or ortho acetate. 0.0003% of polyalkyl-silicone oil, or 0.001% of tetra-amyl having at least one hydrogen attached directly to the nitrogen and having at least one aliphatic radical of at least twelve carbon atoms.

5. An additive for lubricating oils and greases to improve their characteristics, comprising a metal derivative of a reaction product of phosphorus pentasulfide and an octadecylamine having at least one hydrogen attached directly to the nitrogen.

6. An additive for lubricating oils and greases to improve their characteristics, comprising a group II metal derivative of a reaction product of phosphorus pentasulfide and an octadecylamine having at least one hydrogen attached directly to the nitrogen.

7. An additive for lubricating oils and greases to improve their characteristics, comprising a group III metal derivative of a reaction product of phosphorus pentasulfide and an octadecylamine having at least one hydrogen attached directly to the nitrogen.

8. An additive for lubricating oils and greases to improve their characteristics, comprising a metal derivative of a reaction product of phosphorus pentasulfide and an amine having at least one hydrogen attached directly to the nitrogen and having at least one aliphatic radical of at least twelve carbon atoms, reacted at a temperature in the range of about 250° to about 400° F.

9. An additive for lubricating oils and greases to improve their characteristics, comprising a metal derivative of a reaction product of phosphorus pentasulfide and an octadecylamine having at least one hydrogen attached directly to the nitrogen, reacted in mol ratio of one mol of the amine to from 0.25 to 1.0 mols of the sulfide.

10. An additive for lubricating oils and greases to improve their characteristics, comprising a metal derivative of a reaction product of phosphorus pentasulfide and an organic amine having at least one hydrogen attached directly to the nitrogen and having at least one aliphatic radical of at least twelve carbon atoms, containing from about 0.25 to 6.0 equivalents of the metal residue per mol of phosphorus pentasulfide residue.

11. An additive for lubricating oils and greases to improve their characteristics, comprising a metal derivative of a reaction product of phosphorus pentasulfide and an octadecylamine having at least one hydrogen attached directly to the nitrogen, formed from the said sulfide-amine reaction product by reaction with a compound of the said metal at a temperature in the range of about 180° to about 250° F.

12. An additive for lubricating oils and greases to improve their characteristics, comprising a zinc derivative of a reaction product of phosphorus pentasulfide and an organic amine having at least one hydrogen attached directly to the nitrogen and having at least one aliphatic radical of at least twelve carbon atoms, containing from about 4.0 to about 6.0 equivalents of zinc per mol of phosphorus pentasulfide residue.

13. An additive for lubricating oils and greases to improve their characteristics, comprising a barium derivative of a reaction product of phosphorus pentasulfide and an organic amine having at least one hydrogen attached directly to the nitrogen and having at least one aliphatic radical of at least twelve carbon atoms, containing from about 4.0 to about 6.0 equivalents of barium per mol of phosphorus pentasulfide residue.

14. An additive for lubricating oils and greases to improve their characteristics, comprising an aluminum derivative of a reaction product of phosphorus pentasulfide and an organic amine having at least one hydrogen attached directly to the nitrogen and having at least one aliphatic radical of at least twelve carbon atoms, containing from about 4.0 to about 6.0 equivalents of aluminum per mol of phosphorus pentasulfide residue.

15. A lubricant comprising a mineral lubricating oil and 0.01% to 50% of an addition agent comprising a zinc derivative of a reaction product of phosphorus pentasulfide and an octadecylamine having at least one hydrogen attached directly to the nitrogen reacted at a temperature in the range of about 250° to about 400° F., containing from about 4.0 to about 6.0 equivalents of zinc per mol of phosphorus pentasulfide residue, and formed from the said sulfide-amine reaction product by reaction with a zinc compound at a temperature in the range of about 180° to about 250° F.

16. A lubricant comprising a mineral lubricating oil and from 0.01% to 50.0% of an addition agent comprising a barium derivative of a reaction product of phosphorus pentasulfide and an octadecylamine having at least one hydrogen attached directly to the nitrogen, reacted at a temperature in the range of about 250° to about 400° F., containing from about 4.0 to about 6.0 equivalents of barium per mol of phosphorus pentasulfide residue, and formed from the said sulfide-amine reaction product by reaction with a barium compound at a temperature in the range of about 180° to about 250° F.

17. A lubricant comprising a mineral lubricating oil and 0.01% to 50.0% of an addition agent comprising an aluminum derivative of a reaction product of phosphorus pentasulfide and an octadecylamine having at least one hydrogen attached directly to the nitrogen reacted at a temperature in the range of about 250° to about 400° F., containing from about 4.0 to about 6.0 equivalents of aluminum per mol of phosphorus pentasulfide residue, and formed from the said sulfide-amine reaction product by reaction with an aluminum compound at a temperature in the range of about 180° to about 250° F.

JOHN D. BARTLESON.
FRANKLIN VEATCH.